US006989112B2

(12) United States Patent
Teng et al.

(10) Patent No.: US 6,989,112 B2
(45) Date of Patent: Jan. 24, 2006

(54) DYE COMBINATIONS FOR IMAGE ENHANCEMENT FILTERS FOR COLOR VIDEO DISPLAYS

(75) Inventors: Chia-Chi Teng, Piscataway, NJ (US); Suk Youn Suh, Warren, NJ (US); George Malinoski, Fair Haven, NJ (US)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 10/222,774

(22) Filed: Aug. 19, 2002

(65) Prior Publication Data

US 2003/0015692 A1 Jan. 23, 2003

Related U.S. Application Data

(63) Continuation of application No. 09/234,314, filed on Jan. 21, 1999, now abandoned.

(51) Int. Cl.
*G02B 5/22* (2006.01)
*H01J 61/40* (2006.01)

(52) U.S. Cl. ...................... 252/582; 313/112; 313/485; 313/635; 359/885; 428/411.1

(58) Field of Classification Search ............. 428/411.1, 428/690; 359/885, 890, 892; 313/485, 493, 313/112, 634, 636, 635; 252/582
See application file for complete search history.

(56) References Cited

U.S. PATENT DOCUMENTS

| | | | | |
|---|---|---|---|---|
| 3,601,532 | A | 8/1971 | Bitzer | |
| 3,847,604 | A | 11/1974 | Hagenbach et al. | |
| 3,848,248 | A | 11/1974 | MacIntyer, Jr. | |
| 4,245,242 | A | 1/1981 | Trcka | |
| 4,395,835 | A | 8/1983 | Schneider | |
| 4,563,612 | A | 1/1986 | Deal et al. | 313/478 |
| 4,785,217 | A | 11/1988 | Matsuda et al. | 313/479 |
| 4,977,347 | A | 12/1990 | Itou et al. | 313/478 |
| 4,989,953 | A | 2/1991 | Kirschner | |
| 5,091,718 | A | 2/1992 | Beatty | |
| 5,121,030 | A | 6/1992 | Schott | 313/474 |
| 5,178,955 | A | 1/1993 | Aharoni et al. | 428/421 |
| 5,200,667 | A | 4/1993 | Iwasaki et al. | 313/478 |
| 5,751,483 | A | 5/1998 | Itoh et al. | 359/502 |
| 5,818,168 | A | 10/1998 | Ushifusa et al. | 313/582 |
| 5,834,122 | A | 11/1998 | Teng et al. | 428/412 |
| 6,165,546 | A | 12/2000 | Teng et al. | 427/163.1 |
| 6,229,252 | B1 | 5/2001 | Teng et al. | 313/112 |
| 6,344,710 | B2 | 2/2002 | Teng et al. | 313/479 |
| 6,452,331 | B1 | 9/2002 | Sakurada et al. | 313/582 |

FOREIGN PATENT DOCUMENTS

| | | |
|---|---|---|
| JP | 02 210486 | 8/1996 |

OTHER PUBLICATIONS

George Ban et al., "Enhancing the Brightness Capability of Color-TV Receivers Through the Use of Spectrally Selective Tinted Glass", Journal of Electrochemical Society, Electrochemical Society, vol. 4, No. 116, Apr. 1, 1969, pp. 531-534. XP 002078007.

*Primary Examiner*—Marie Yamnitzky
(74) *Attorney, Agent, or Firm*—Oblon, Spivak, McClelland, Maier & Neustadt, P.C.

(57) ABSTRACT

A bandpass filter containing specific red dyes alone or in combination with other dyes selectively transmits predetermined primary color wavelengths as well as selectively absorbs wavelengths other than the predetermined primary color wavelength. The filter is particularly useful for enhancing the contrast of color plasma displays by absorbing visible light emitted at 590 nm from the display.

28 Claims, 10 Drawing Sheets

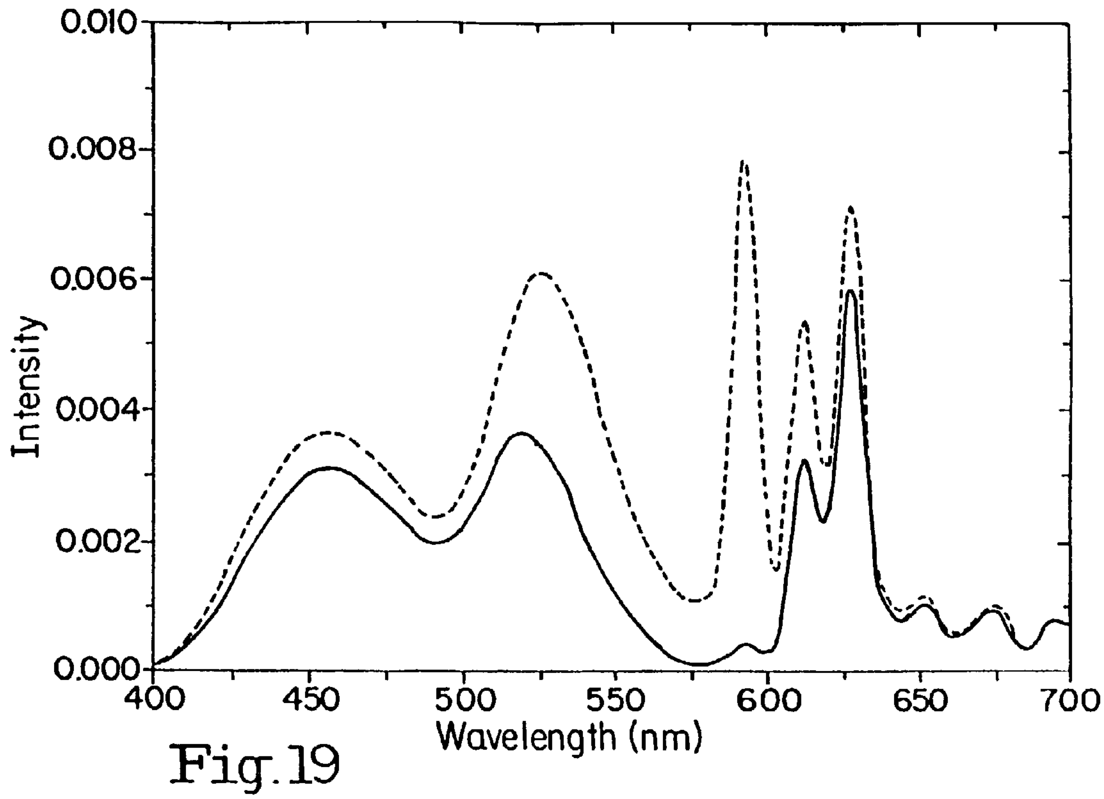
Fig. 19
Fig. 20
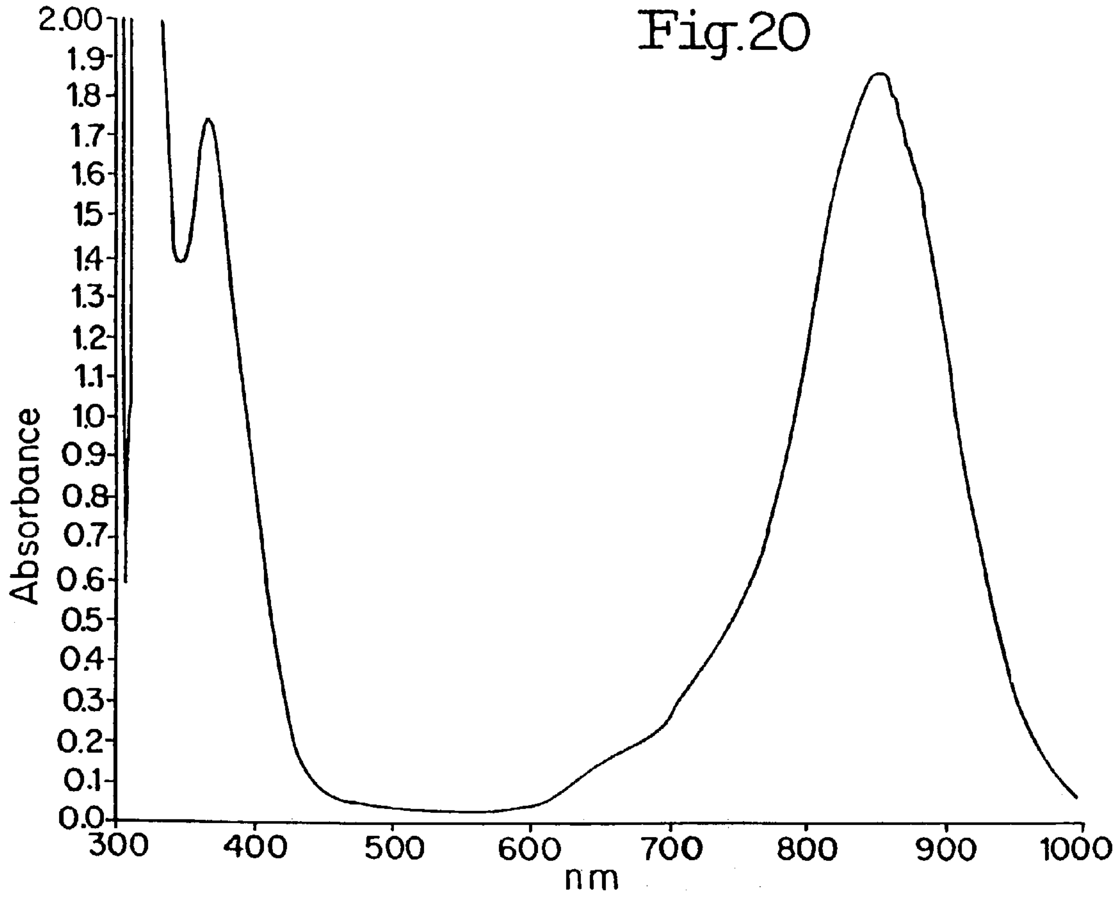

DYE COMBINATIONS FOR IMAGE ENHANCEMENT FILTERS FOR COLOR VIDEO DISPLAYS

CROSS-REFERENCE TO RELATED APPLICATIONS

The present application is a Continuation Application of U.S. patent application Ser. No. 09/234,314 filed on Jan. 21, 1999, now abandoned.

FIELD OF THE INVENTION

The present invention is directed to filters, including multiple bandpass filters, for video display devices and similar articles. Specifically, the present invention is directed to filters containing specific dye combinations for color video display devices.

BACKGROUND OF THE INVENTION

Video display devices are nowadays widely used in articles such as televisions, computers, video games and the like. Many of them generally employ a cathode ray tube (CRT) which is a vacuum tube display device in which the image is created by electrons from an electron gun striking a phosphor screen that converts the electron energy into light energy over a wide wavelength range, usually the visible range for common display devices such as television and computer monitors. The CRT may be monochromatic (single color) or a color display device which produces images in more than one color, typically the three primary colors: red, green and blue.

A common problem with video display devices is the light reflected from the device towards the viewer, which generally fatigues the viewer's eyes. The reflected light consists of ambient light reflecting off the surface of the screen (which is typically a glass surface) as well as ambient light reflecting off the phosphors behind the screen. Several attempts have been made in the past to avoid or reduce this reflected light. U.S. Pat. No. 4,989,953, in column 2, line 13 through column 3, line 22, describes some of these earlier attempts and the problems associated with them. Most of these attempts, however, have succeeded in reducing the glare from monochromatic display monitors only.

For color displays, earlier attempts to reduce light reflection included, for example, use of a neutral density filter. Neutral density filters or attenuators are designed to produce attenuation that is uniform regardless of the wavelength. See, for example, Jeff Hecht, "The Laser Guidebook," 2nd edition, McGraw-Hill, Inc., New York, 1992, page 79. Such filters comprise colloidal suspensions of silver or graphite particles in a suitable medium and adhere to the monitor surface. This type of filter transmits a fraction of the light passing through it, independent of the wavelengths. In fact, neutral density filters are widely used in the manufacturing of current color CRT displays for lack of no better alternative. These filters, however, have the disadvantage of reducing the brightness of the image.

Another approach has been to use selective filtration by using different colored plates to absorb certain wavelengths. They, however, suffer the disadvantage that one has to use a different color filter for each phosphor element. Combining several filter materials in order to transmit just the desired red, green and blue generally results in the absorption of some of the desired wavelengths due to cascading of the different filter materials. This reduces the amount of red, green and blue that eventually gets transmitted.

Yet another approach involves a combination of a neutral density filter and an antireflection coating. While this cuts down the reflected light, it also reduces the brightness of the image.

U.S. Pat. No. 5,121,030 discloses absorption filters which contain a transparent substrate with a plurality of spatially separated areas that contain selective absorptive dye colorants. Since this requires spaced areas with different dye components therein, the construction of the filter is quite complex and difficult to manufacture in large quantities.

U.S. Pat. No. 4,989,953 referred to above advocates the use of colored filters for monochromatic displays. Thus, for example, a magenta colored filter is used for CRTs with green phosphors, and a blue colored filter is used for amber colored CRTs. However, this concept is not much useful for color displays because the blue filter, for example, will block out the red and/or green depending on the spectral characteristics of the filter. The same problem exists for the other color filters that U.S. Pat. No. 4,989,953 discloses. If such filters are used for full color displays, the resulting display color will be severely distorted. For this reason, U.S. Pat. No. 4,989,953 suggests that a neutral density or gray colored filter must be used for multi-color or black and white displays. However, this approach, as stated before, reduces the brightness of the display. Since neutral density filters absorb a substantial amount of the desired light, the displays using neutral density filters must be capable of producing intense light. This was one of the reasons for developing super bright phosphors for display applications. Such bright phosphors substantially increase the cost of the display, however.

Another kind of visual display device being increasingly used is characterized as a plasma display panel (PDP). The basic mechanism of monochrome display operation is relatively simple. Inert gases, such as helium, neon, argon, xenon or mixtures thereof are hermetically sealed in a glass envelope and are subjected to a high voltage which causes the gas to ionize, producing a plasma. Color operation can also be achieved in a plasma display. Such operation utilizes ultraviolet light generated by the plasma discharge, rather than the glow of color of the plasma directly. Thus, in color operation, phosphors are placed in the vicinity of the plasma discharge. The plasma-generated UV light hits the phosphors and generates visible light for the display. Plasma display panels, also known as gas display panels, have features such as a wide viewing angle, easy to see display because of self light emission, and a slim form. These advantages have encouraged increasing use of gas discharge display panels for high quality television sets. The exact structure of the PDPs is not a feature of the present invention, and it is contemplated, that the filters of this invention are useful for any color PDP regardless of the exact configuration. Those of ordinary skill in the art would be capable of using the inventive filter with any PDP device.

Unfortunately, plasma displays currently being developed by various display manufacturers, still do not have high enough brightness nor high enough red, green, and blue color transmission. Therefore, neutral density filters cannot effectively be used for color and contrast enhancement in plasma display applications since such filters would further reduce the brightness of the display. Additionally, since the sub-pixels of the phosphors are in close proximity to each other, there is a need for a physical barrier to prevent stimulation of a non-selected phosphor region.

Thus, in view of the varied uses and potential uses for CRTs and plasma display panels there is a need in the industry to have some device or mechanism to efficiently reduce the reflected light from the display devices as well as increase overall color and improve contrast and color enhancement without significantly sacrificing the brightness and resolution of the image.

It is, therefore, an object of this invention to provide a filter for color displays to reduce light reflected off such displays.

It is an additional object of this invention to provide a filter containing specific dye sets to enhance the contrast and color of images from a color display monitor without significantly sacrificing brightness of the image therefrom.

It is a further object of this invention to provide a spectrally tuned multiple bandpass filter for color displays, specifically matched to the three primary colors, namely red, green, and blue.

Other objects and advantages of this invention will be apparent to those skilled in the art from the accompanying description and examples.

SUMMARY OF THE INVENTION

One or more of the foregoing objects are achieved by the provision in the present invention of a spectrally tuned bandpass filter which is adherable to a display monitor surface in a variety of ways and enhances the contrast and color of the image without significantly affecting the brightness and resolution of the image. The filter of the present invention also can be free-standing and placed in front of the display monitor. The filter comprises at least one specific red dye or a mixture of specific red dyes alone or in combination with other specific dye mixtures and which is adapted to substantially selectively transmit predetermined primary color wavelengths of an electromagnetic spectrum as well as to selectively absorb wavelengths other than said predetermined primary color wavelengths. The dyes may be on a suitable transparent substrate which is then adhered to the monitor surface, or alternately, the dyes may be directly deposited on the monitor surface by a suitable process such as, for example, spray coating. Preferably, the dye or combination of dyes are uniformly mixed within a transparent polymer matrix.

The word "spectrally tuned" refers to the substantial selective transmission (at least 50%) of the predetermined primary colors; the word "transparent" refers to at least 70% transmission of light of the electromagnetic spectrum which in the common case such as television display devices such as CRT, plasma displays and the like, is the visible light. In such a case, the primary colors are red, green and blue.

Additionally, the present inventive bandpass filter allows one to expand the color gamut by adjusting the spectral bandwidth of the bandpass windows in the respective wavelengths, thereby allowing more vivid and realistic colors on CRTs and PDPs. This is a significant improvement over present visual display technology.

The present inventive bandpass filter also shields electromagnetic induction and IR radiation from PDPs which interfere with the operation of remote control units.

Still additionally, if one so desired, one may deposit a suitable antireflection coating on top of the inventive contrast and color enhancing filter. In that case, the antireflection coating should be chosen as not to affect the integrity of the filter physically, chemically and optically. Suitable antireflection coatings are described, for example, in U.S. Pat. No. 5,178,955.

BRIEF DESCRIPTION OF THE DRAWINGS

FIG. 19 is a graph illustrating the intensity of the phosphors of a PDP with and without a filter of the present invention.

FIG. 20 is the absorbance spectrum of dye IRA 850, an infrared shielding dye, dissolved in MEK and DMF in a PMMA matrix.

DESCRIPTION OF THE INVENTION

Figure 1:
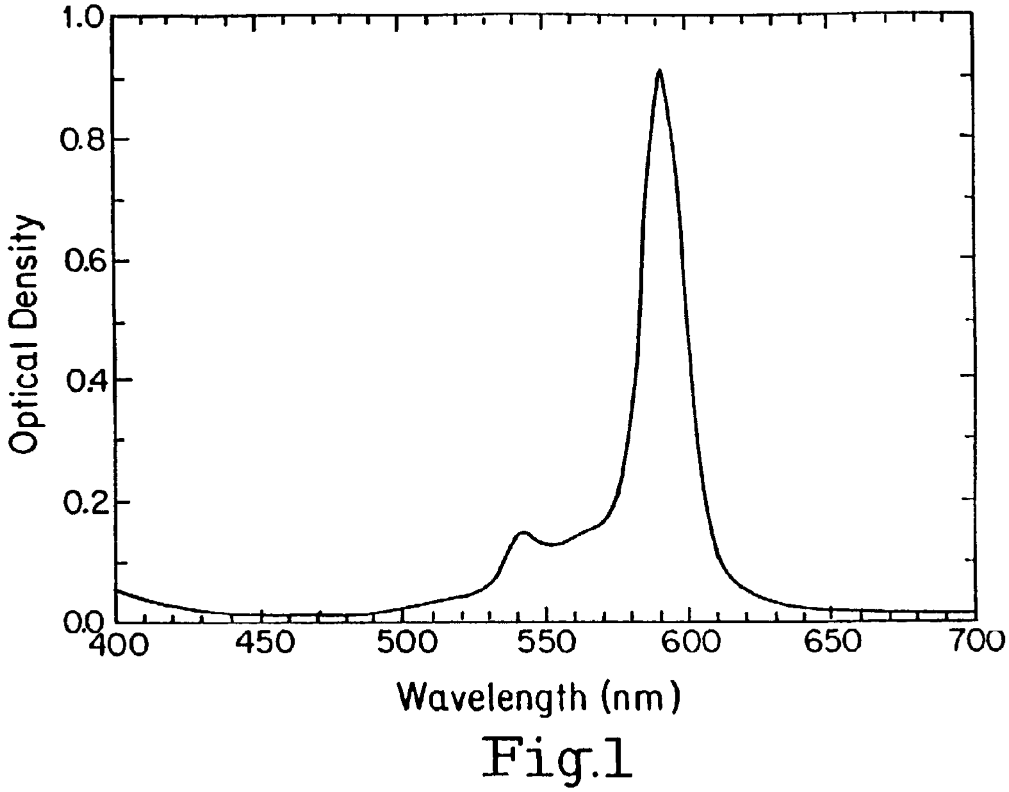
FIG. 1 discloses the absorbance spectrum of red dye, ABS 594.

The present invention discloses a spectrally tuned bandpass filter (notch filter) including multiple bandpass filter, which substantially increases the transmission of the primary colors from the reflected light of a color display device while substantially absorbing the non-primary colors, and thereby improving the contrast and color of the image for the viewers. The filter comprises a specific set of suitable, dyes that substantially absorb the non-primary colors without significant effect on the primary colors.

Contrast from a display device screen is generally defined by the term "contrast ratio". Contrast ratio, C, is commonly defined by the Equation 1:

$$C=\frac{\int T(\lambda)S(\lambda)I_p(\lambda)d\lambda}{\int T^2(\lambda)S(\lambda)I_a(\lambda)R(\lambda)d\lambda} \quad (1)$$

where T is the transmittance of the substrate as a function of wavelength $\lambda$, S is human eye spectral sensitivity function, $I_p$ and $I_a$ are respectively the display source intensity (e.g., phosphor emission intensity) and the ambient light source intensity, and R is the Reflection Coefficient for the display phosphors. As can be seen, C can be increased by making $I_a$ and/or $T(\lambda)$ arbitrarily small for a given display system. However, if a display is viewed in the total darkness ($I_a$ very small), although one can have very high contrast, it becomes very difficult to compare two different displays without using an identical condition. Display industries are therefore making an attempt to use a standardized ambient light condition in comparing display performance. Similarly by increasing $I_p$, one can improve C. In fact, display industry is working very hard to increase $I_p$. Since $I_a$ and $I_p$ are independent of contrast enhancing devices, normalized intensities functions given in Equations 2 and 3 are generally defined in order to compare the performance of contrast enhancing devices:

$$i_p=\frac{\int T(\lambda)S(\lambda)I_p(\lambda)d\lambda}{\int S(\lambda)I_p(\lambda)d\lambda} \quad (2)$$

and $$i_a=\frac{\int T(\lambda)S(\lambda)I_a(\lambda)d\lambda}{\int S(\lambda)I_a(\lambda)d\lambda} \quad (3)$$

where $i_a$ and $i_p$ are normalized ambient and display intensities respectively. Normalized contrast (C) and the figure-of-merits ($\eta$) are defined as in Equations 4 and 5 respectively:

$$\overline{C}=\frac{i_p}{i_a} \quad (4)$$

and $$\eta=\overline{C}i_p=\frac{i_p^2}{i_a} \quad (5)$$

For an ideal neutral density or similar filters, there is no improvement in the figure-of-merits, i.e., $\eta$=1. Thus, they do not improve the real performance, but provide a trade-off between display brightness and contrast. In other words, they offer contrast enhancement at the expense of image brightness. Thus, for example, for a 50% absorptive neutral density filter, contrast may be doubled, i.e., $\overline{C}$=2, $i_p$=0.5 and $i_a$=0.25. But there is 50% absorption.

The figure-of-merit is a contrast between the color contrast of the image and the brightness of the image. In other words, the figure-of-merit is a balance between the two variables of color contrast and brightness of the image. Both good color contrast and brightness are desired. For example, an $\eta$=1.2 means that the contrast is about 20% greater than the brightness. An $\eta$<1 means that the contrast can still be improved in the image.

The spectrally tuned filters of the present invention comprise suitable dyes contained uniformly within a carrier matrix such as a polymer matrix. The filters may be present on a CRT or PDP monitor with or without an intermediary polymeric substrate. Alternatively, the filters can be free standing and placed in front of the CRT or PDP monitor. Suitable dyes are those which selectively absorb undesired wavelengths without significantly absorbing the desired wavelengths. The desired wavelengths correspond to the three primary colors; red, blue and green. Table 1 lists suitable dyes useful in the practice of the invention. Many of these are commercially available trademarked materials from various sources. One such source is Aldrich Chemical Company, Milwaukee, Wis.

TABLE 1

| List of Suitable Dyes |
|---|
| ABS 574 |
| ABS 594 |
| Astrazon Orange G |
| Brilliant Blue R |
| Luxol Fast Blue MBSN |
| Bromochlorophenol Blue Sodium salt |
| Bromophenol Blue Sodium salt |
| Bromocresol Purple Sodium salt |
| 2',7'-Dichlorofluorescein |
| Eosin Y |
| Fluorescein |
| Fluorescein amine isomer 1 |
| Fluorescein amine isomer 11 |
| Fluorexon |
| Bromophenol Blue |
| Acridine Orange |
| Acridine Orange base |
| σ-Cresolphthalein |
| σ-Cresolphthalein complexone |
| Cresol Red |
| Fast Blue |
| Mordant Orange 1 |
| Phloxine B |
| Pyronin B |
| Rhodamine 101 |
| Rhodamine 123 Hydrate |
| Sulfobromophthalein Sodium Hydrate |

TABLE 1-continued

| List of Suitable Dyes |
|---|
| Sulforhodamine 101 Hydrate |
| Chlorophenol Red |
| IRA 850 |

Useful dyes for general purpose image enhancement application in the filters of this invention should have the following characteristics:

1. Absorption Characteristics
   a) Absorption peak (λ) falling into one of the following wavelength regions:
      λ<430 nm
      470 nm<λ<510 nm
      550 nm<λ<610 nm
      λ>650 nm
   b) Absorption Bandwidth is within the range of 30–80 nm.
2. Stability
   a) Light fastness
      Less than 10–20% degradation under 85 MJ/$m^2$ exposure of white light (400 nm to 700 nm).
   b) Thermal stability
      Less than 10–20% degradations under following stress conditions 70° C., 70% RH and 72 hrs.
3. Solubility
   a) Soluble in an environmentally friendly solvent.
   b) Soluble in an optically clear polymer resin matrix suitable for high quality coating.

Various combinations of the dyes listed in Table 1 may be employed to obtain a bandpass filter of this invention. Preferably, the dye combinations include at least one or more red dyes having the absorbance spectrums of FIG. 1 or 2 as well as having the stability and solubility described above. Combinations of these particular red dyes with other colored dyes can be made to yield effective multiple bandpass filters for display devices such as CRTs and PDPs and the like.

ABS 594 dye and ABS 574 dye are available from Exiton, Inc. of Dayton, Ohio, a maker of specialty dyes. These red dyes have the absorbance spectra illustrated in FIG. 1 and FIG. 2, respectively. The absorbance spectrum of each dye was prepared by preparing a 0.050% sample of each dye in a methylethyl ketone solution containing 25% of polymethyl methacrylate. The samples were then measured on a standard spectrophotometer. The value of optical density, i.e., absorbance, of the dye is not particularly important in defining a dye material. The value of optical density or absorbance is always going to be greater when the concentration of the test sample is increased. However, the wavelength where the peak or peaks of the absorbance spectrum occur are unique and remain constant for a particular dye. The location of the absorption peak is fixed once the dye and solvent system is selected. Thus, it is the location of the absorption peak or peaks which characterizes a dye or dye composition.

In addition to the location of the absorption peaks, the bandwidth of the spectrum (absorption peaks) can also be used to identify a dye. In an optical density versus wavelength plot, the full width in nm at the half peak height is measured as bandwidth.

IRA 850 dye, listed in table 1, which is also available from Exiton, Inc., has the absorbance spectrum illustrated in FIG. 20. The absorbance spectrum was prepared by adding a 0.05% sample of the IRA 850 dye to a solution of about 33% dimethylfuran and a 67% mixture of polymethyl methacrylate and methylethyl ketone by weight. The sample was measured on a standard spectrophotometer. The IRA 850 dye is especially effective in shielding IR radiation from plasma display panels as shown in Example 8 below. IR radiation emitted from plasma display panels interferes with the operation of remote control units thus, compromising the optimum performance of such electronic equipment.

The dye compositions (the total weight of all the dyes) comprise generally from about 0.01% to about 10% by weight of the dry carrier matrix used to form the filter of this invention. Preferably, the dyes comprise from about 0.04% to less than about 4.0% by weight of the dry matrix. The following are general and preferred ranges of particular dyes useful in this invention. Specific amounts of each dye in particular combinations of dyes are shown in the Examples and can provide a reference to the effect each dye has on the overall absorbance spectrum of the filter. Such examples can suggest other useful dye combinations within the general and preferred weight ranges shown and even beyond the combinations shown in the examples to provide an effective color enhancement filter. Dye ABS 574 comprises from about 0.02% to about 0.45% by weight of the matrix, preferably about 0.10% to about 0.45%. ABS 594 comprises from about 0.04% to about 0.85% by weight of the matrix, preferably from about 0.04% to about 0.80%. Combinations of ABS 574 and ABS 594 are particularly useful either alone or with other dyes. Additionally, Astrazon Orange in amounts of from about 0.02% to about 2.0% by weight of the matrix, preferably from about 0.060% to about 1.0%; Luxol Fast Blue in amounts of from about 0.02% to about 2.0% by weight of the matrix, preferably from about 0.06% to about 1.0%; Disperse Yellow 9 in amounts from about 0.20% to about 0.80% by weight of the matrix, preferably from about 0.40% to about 0.70%; and IRA 850 in amounts from about 0.50% to about 10.00% by weight of the matrix, preferably from about 4.00% to about 8.00%, can be used singly or in combination with the ABS red dyes to yield filters with multiple pass bands of the primary colors.

The spectrally tuned filters of the present invention can be prepared by any suitable method in the art for preparing films and coated films. A set of suitable dyes (e.g., from Table 1) and resin system is dissolved in a suitable solvent to a sufficient enough concentration to result in sufficient absorption of the undesired wavelengths in the transmitted light when on the monitor. Sufficient absorption is generally over 20%, preferably over 50% and typically over 80%. Suitable solvents are those that are compatible with the solvents chosen for the polymer matrix material as well as dependent on whether or not the dye/polymer matrix combination is going to be present on a polymeric substrate before going on the monitor. Such modifications and techniques will be obvious to those skilled in the art of coatings. Generally a lower alcohol, water, and the like solvents are non-corrosive and compatible with each other. Thus, for example, the dyes may be dissolved in a lower alcohol to form solution A, the polymer matrix material may be dissolved in water or alcohol to form solution B and the two solutions may then be mixed in sufficient quantities. Polymer matrix materials are those polymers which are compatible with the other materials mentioned above and also form optically transparent films. Some examples include polyvinyl alcohol (PVOH), polyvinyl acetate (PVA), vinyl polymers and polyacrylates such as polyolefins, polymethyl methacrylate (PMMA), polystyrene, cycloolefin polymers and copolymers (COC), polycarbonate, polyurethane, polyamide, polyester, polyether, polyketone, polyesteramide, polyvinyl butyrate (PVB), and the like. Many of the polymers may also be crosslinkable by suitable techniques such as, for example, thermal, radiation cure and the like. After mixing solutions A and B, one may optionally add additives such as, for example, viscosity modifiers, surfactants, volatilizers and the like in order to ease and/or enhance film casting, film drying, film thickness and the like. Such techniques are well known in the coatings industry.

One or more films may be formed from the mixture of dye or dyes and polymer matrix by any suitable technique such as, for example, solvent casting, extrusion, spray coating, roller coating, dip coating, brush coating, spin coating and the like. Such film forming techniques are well known. Alternately, instead of forming the film or films from a mixture of dye and polymer, the polymer matrix may be formed first as a film and then dyed. The film, or films may then be affixed to the monitor surface by a suitable method such as, for example, use of adhesives.

Still alternately, the mixture of dye and polymer matrix may be spun coated on a suitable substrate as a film or films. The coated substrate may then be affixed to the monitor surface by a suitable method such as, for example, use of adhesives. Suitable substrates are glass as well as polymeric. Suitable polymeric substrates are optically transparent polymers such as, for example, polyesters, polyacrylates, polyolefins, polycarbonate and the like. Among polyesters, polymer films such as polyethylene terephthalate (PET), polybutylene terephthalate (PBT) are preferred.

When extruded to form a film the dyes can be incorporated into the molten polymer matrix during extrusion into a film or the dye and matrix polymer mixture can first be extruded into pellets and the pellets melted and extruded into the desired film. The film may then be affixed to the monitor surface by any suitable method. Such a method is particularly useful when a polyester such as PET or PBT is used as the matrix.

In yet another alternate manner, the dye/polymer mix may be sprayed directly onto the monitor to form a suitable film. The invention is flexible enough to accommodate such varied methods.

The bandpass filter of the present invention can preferably be employed on both a CRT screen or a plasma display panel. The filter of the present invention can be applied to the outer surface of the face plate of CRTs of televisions, computer screens, and the like, or the filter can be free-standing and placed before the screen. The inner surface of the CRT screen contains a color phosphor. Examples of such CRT screens can be found in U.S. Pat. No. 4,977,347, to Itou et al., U.S. Pat. No. 4,785,217, to Matsuda et al., and U.S. Pat. No. 4,563,612, to Deal et al., the disclosures of which are incorporated in their entirety herein by reference.

The bandpass filters of the present invention can also be employed on plasma display panels. Plasma display panels are essentially a sandwich of glass sealed at the edges with a low temperature frit enclosing an inert gas mixture and thin-film conductive electrodes on the inner surfaces of the glass. Parallel lines of transparent conductors are placed on one of the inner surfaces and metal electrodes are on the outer surfaces. The filter of the present invention is placed on the face of the outer glass surface, or the filter can be free-standing and placed before the face of the outer glass surface. Examples of suitable plasma display panels are U.S. Pat. No. 5,818,168, to Ushifusa et al., and U.S. Pat. No. 3,601,532, to Blitzer et al., the disclosures of which are incorporated herein in their entirety by reference.

The following examples are intended to illustrate the present invention, but are not intended to limit the scope of the invention.

EXAMPLE 1

Plasma displays are faced with two major problems: (1) low blue intensity, and (2) low red color purity due to an unwanted intense orange peak around 590 nm in the red phosphor emissions spectrum. The dye set in the present example was designed to address these two problems.

Figure 2:
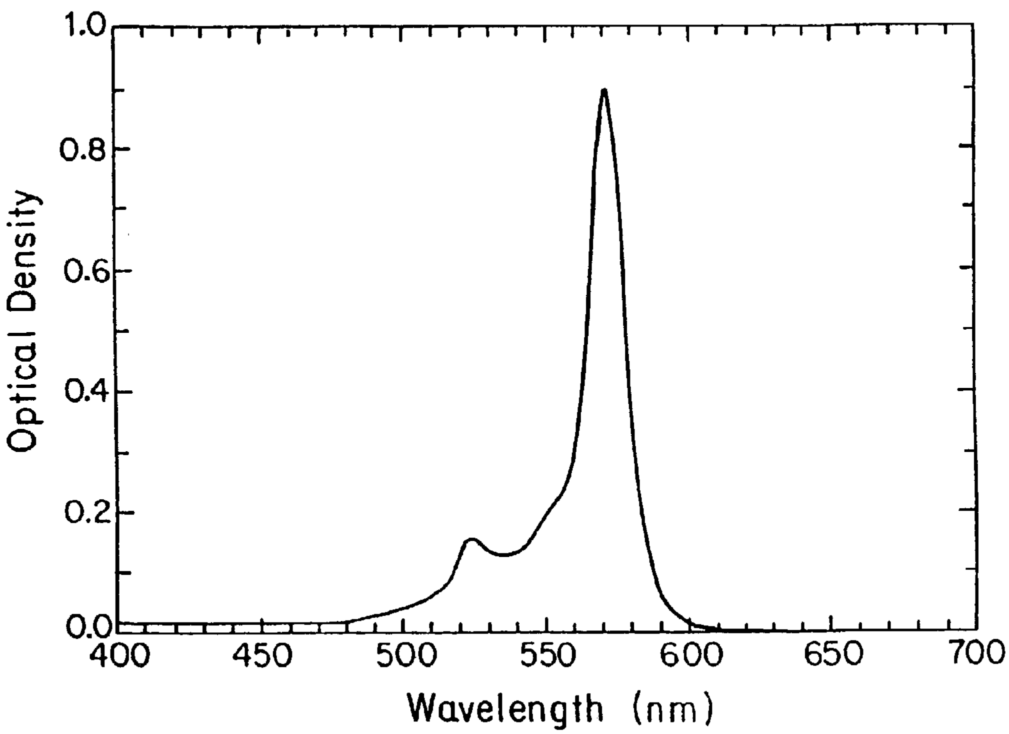
FIG. 2 discloses the absorbance spectrum of red dye, ABS 574.

Dyes ABS 594 and ABS 574 having the absorbance spectrums as shown in FIGS. 1 and 2, respectively, were dissolved in methylethyl ketone to near saturation. Separately, the material employed for the polymer matrix, polymethyl methacrylate was dissolved in methylethyl ketone to about 20 weight %. The dye solution was added to the polymethyl methacrylate solution. A few drops (about 0.01% by weight of surfactants Genepole® and Dynol® were added. The film was spun-coated on a 4 mil (100 micron) thick polyethylene terephalate substrate at about 1,000 rpm for about 30 seconds. The film was then dried in an oven at about 50° C. for about 30 minutes to achieve a total dry film and substrate thickness of about 8 microns. The weight of the dyes in relation to the dry polymer matrix was about 0.040% of ABS 574 and about 0.53% of ABS 594. The filter was mounted on a 5 inch diameter plasma display panel. The filter was attached to the plasma display panel with the adhesive PET. The selected dye combination was found to be very stable optically and compatible with the polymethyl methacrylate polymeric matrix and formed a liquid coated film on the plasma display panel.

Figure 3:
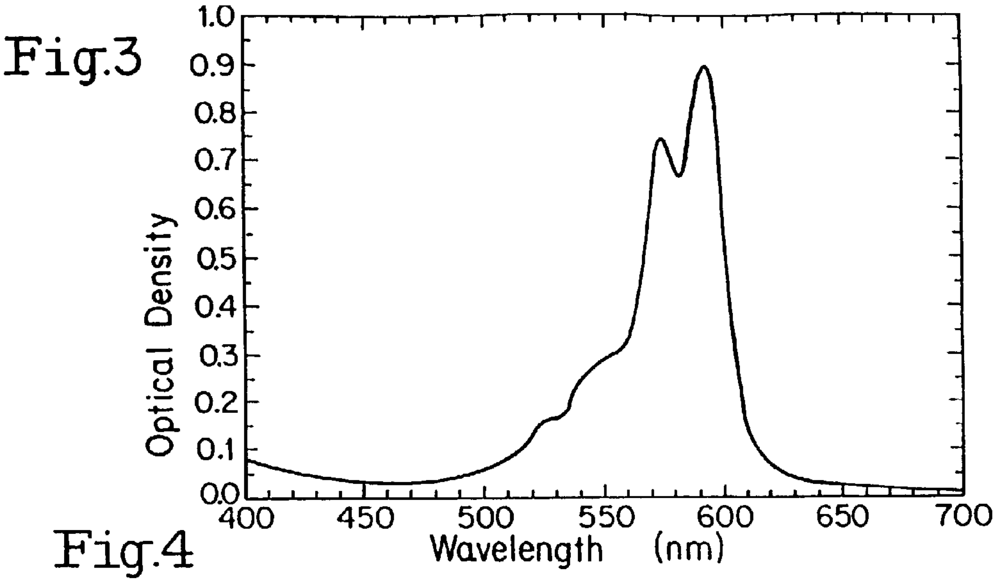
FIG. 3 is the absorbance spectrum of a dye set containing 0.40% ABS 574 and 0.53% ABS 594 in a polymethyl methylacrylate (PMMA) matrix.

As illustrated in FIG. 3, the dye set absorbed the unwanted emission peak at 590 nm. Since the dye set absorbed between the red and green primary colors, it was expected that there would be an impact on both red and green transmittance. Surprisingly, there was a noticed improvement in blue color. The reason for the improved blue color enhancement was uncertain. However, it is believed that all three colors were contaminated by orange emission from neon gas used in the plasma display panel discharges. The orange emission originating from the neon gas was not the same as the emission from the red phosphor, but the emission peaks were very close to each other. One problem with the dye set was a pinkish rest color.

Figure 4:
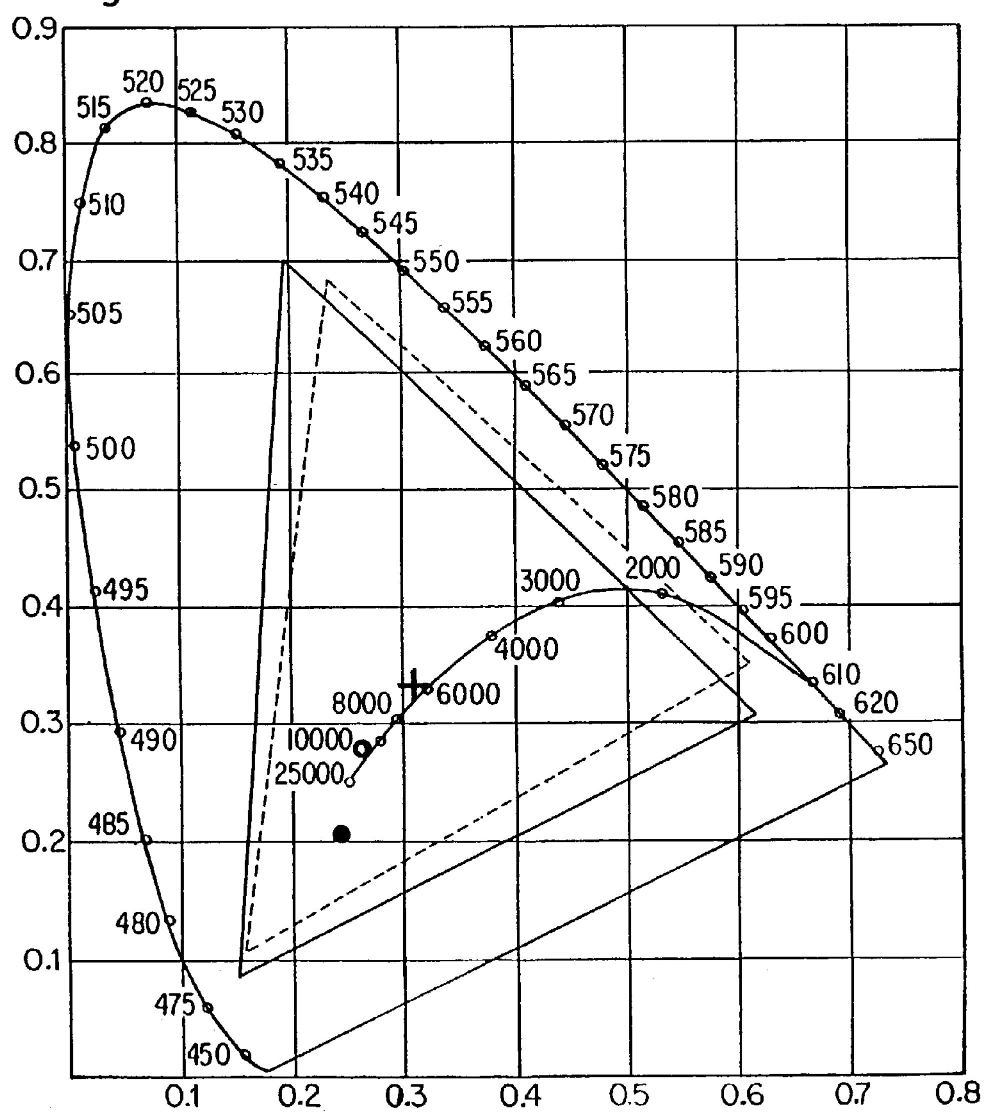
FIG. 4 is the chromaticity diagram of the dye set containing 0.40% ABS 574 and 0.53% ABS 594 in a PMMA matrix.

FIG. 4 is a chromaticity diagram of color emission of a plasma display panel with (solid line) and without (dashed line) a filter. FIG. 4 also shows a spectrum locus (curved temperature scale) of a blackbody radiation in the CIE standard chromaticity diagram. The + is the white point or sunlight, the solid dot shows the ambient light in relation to the transmittance from the filtered and non-filtered panel. The circle on the spectrum locus shows the reflected white light in relation to the transmitted light by the panels.

Table 2 presents the color coordinates of the plasma display panel with and without the filter of this example. As shown by the chromaticity diagram, the dye set has improved transmittance in the red, green, and blue wavelengths over the plasma display panel without a filter.

Since the color coordinates defined in the CIE standard chromaticity diagram are highly non-linear, contrasting the difference between two colors by the color-coordinates alone is difficult. Thus, the E-values or ΔE is determined for each coordinate. The E-value or ΔE is proportional to the human perception difference between two colors. A ΔE=0 indicates that human perception can not distinguish between two colors. A ΔE=about 2 or 3 indicates that a very sensitive observer can tell the difference between two colors. A ΔE=about 5 indicates that there is an obvious difference between two colors to a human observer, and a ΔE>15 indicates that an observer can conclude that a color is completely different from the other colors to which it is compared.

The ΔE for the red, green, and blue were about 34.0, 24.6, and 9.5, respectively. Thus, an observer can completely distinguish the red and green colors of the PDP with the present filter from the red and green colors of the PDP without the filter. The observer can at least conclude that there is an obvious difference between the blue color of the PDP with the filter as opposed to the PDP without the filter.

Also, the dye set has an improved color temperature of about +13,500° K, a relative brightness of about 58.2%, a relative contrast of about 1.57 and a figure of merit of about 0.9137.

EXAMPLE 2

The present dye set was essentially identical to the dye set in Example 1, except that ABS 574 comprised about 0.25% and ABS 594 comprised about 0.50% of the film. The process of preparing the filter in the present example was identical to that in Example 1.

Figure 5:
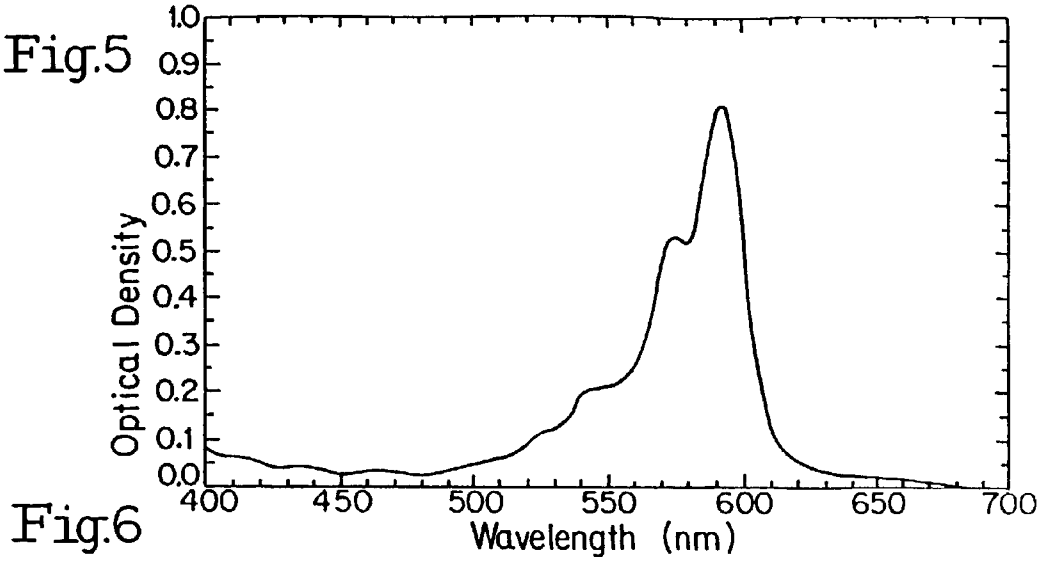
FIG. 5 is the absorbance spectrum of a dye set containing 0.25% ABS 574 and 0.50% ABS 594 in a PMMA matrix.
Figure 6:
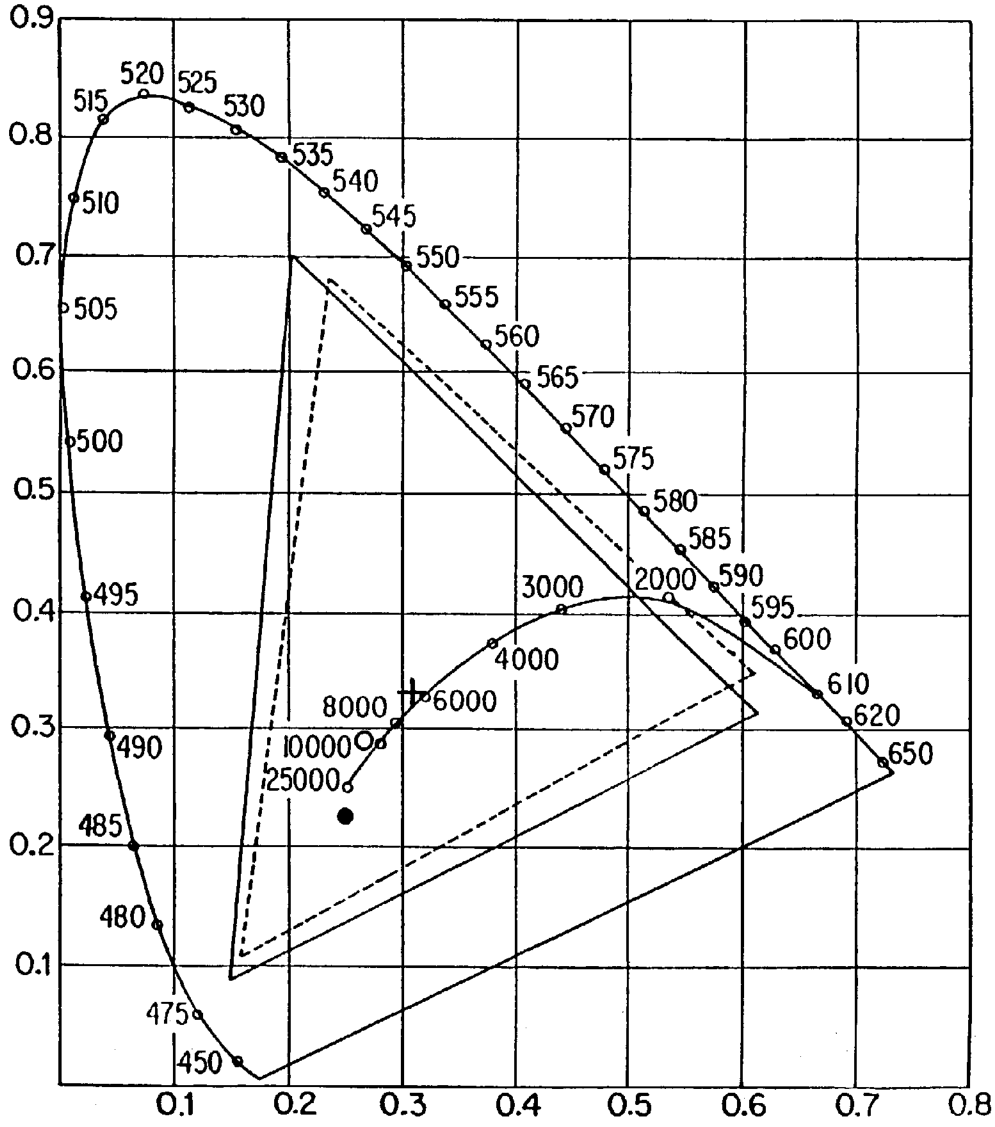
FIG. 6 is the chromaticity diagram of the dye set containing 0.25% ABS 574 and 0.50% ABS 594 in a PMMA matrix.

The filter of this example showed improvements over the filter of Example 1. Thus, the filter of this example showed improvements in the green transmission as illustrated in FIG. 5 and FIG. 6. The overall brightness was increased from about 58.2% to about 63.6% and the figure-of-merit increased from about 0.9137 in Example 1 to about 0.9349, see Table 2. The color temperature improvement was about +7,500° K in contrast to that of the panel display screen without a filter, and the present plasma display panel had a relative contrast of about 1.47.

The ΔE for the red, green, and blue coordinates was about 31.7, 20.0, and 6.8, respectively. Thus, an observer can distinguish the red and green colors of the plasma display panel with the present filter as completely different from the red and green of the plasma display panel without the filter. The observer can conclude that there is at least an obvious difference between the blue of the plasma display panel with the filter in contrast to the plasma display panel without the filter. However, the rest color still remained a problem.

EXAMPLE 3

The present dye set was prepared in an effort to improve the rest color from the dye sets of Examples 1 and 2 while maintaining the relatively high blue transmission.

The present dye set was prepared in a two-layer filter. The first layer comprised a polymer matrix of polymethyl methacrylate having a thickness of about 6 microns. The dye package comprised about 0.40%, ABS 574 and about 0.80% ABS 594 by weight of the film. The first layer was prepared by the same method as described in Example 1.

The second layer was composed of the dye package Astrazon Orange and Luxol Fast Blue. The dyes were dissolved in a solution of 50% water, 30% isopropyl alcohol, and 20% methyl alcohol. The dye solution was added to a polymer matrix of polyvinyl acetate. A few drops (about 0.01% by weight) of the surfactants Genepole® and Dynol® were added. The second layer was spun-coated on the 6 micron first layer at about 1,000 rpm for about 30 seconds. The filter was then dried in an oven at about 50° C. for about 30 minutes to achieve a total thickness of about 12 microns. The weight of the dyes in the dried polyvinyl acetate matrix was about 1.0% Astrazon Orange and about 1.0% Luxol Fast Blue. The filter was mounted on a plasma display panel having a 5 inch diameter.

Figure 7:
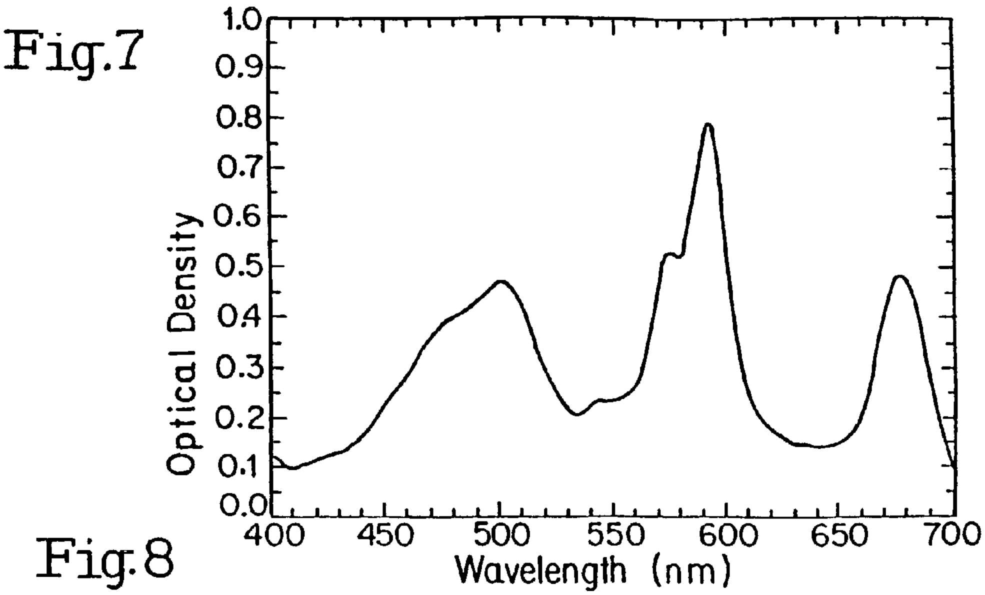
FIG. 7 is the absorbance spectrum of a dye set containing 0.40% ABS 574 and 0.80% ABS 594 in a PMMA matrix in combination with 1.0% Astrazon Orange and 1.0% Luxol Fast Blue in a polyvinyl acetate (PVA) matrix.

FIG. 7 shows the optical density (absorbance) properties of the subject dye set. The dye set produced a pleasing, slightly blue tinted gray rest color. This produced a very high color temperature on the plasma display panel, i.e., about 8,000° K, suggesting that the filter can be tailored for the color temperature of displays.

Figure 8:
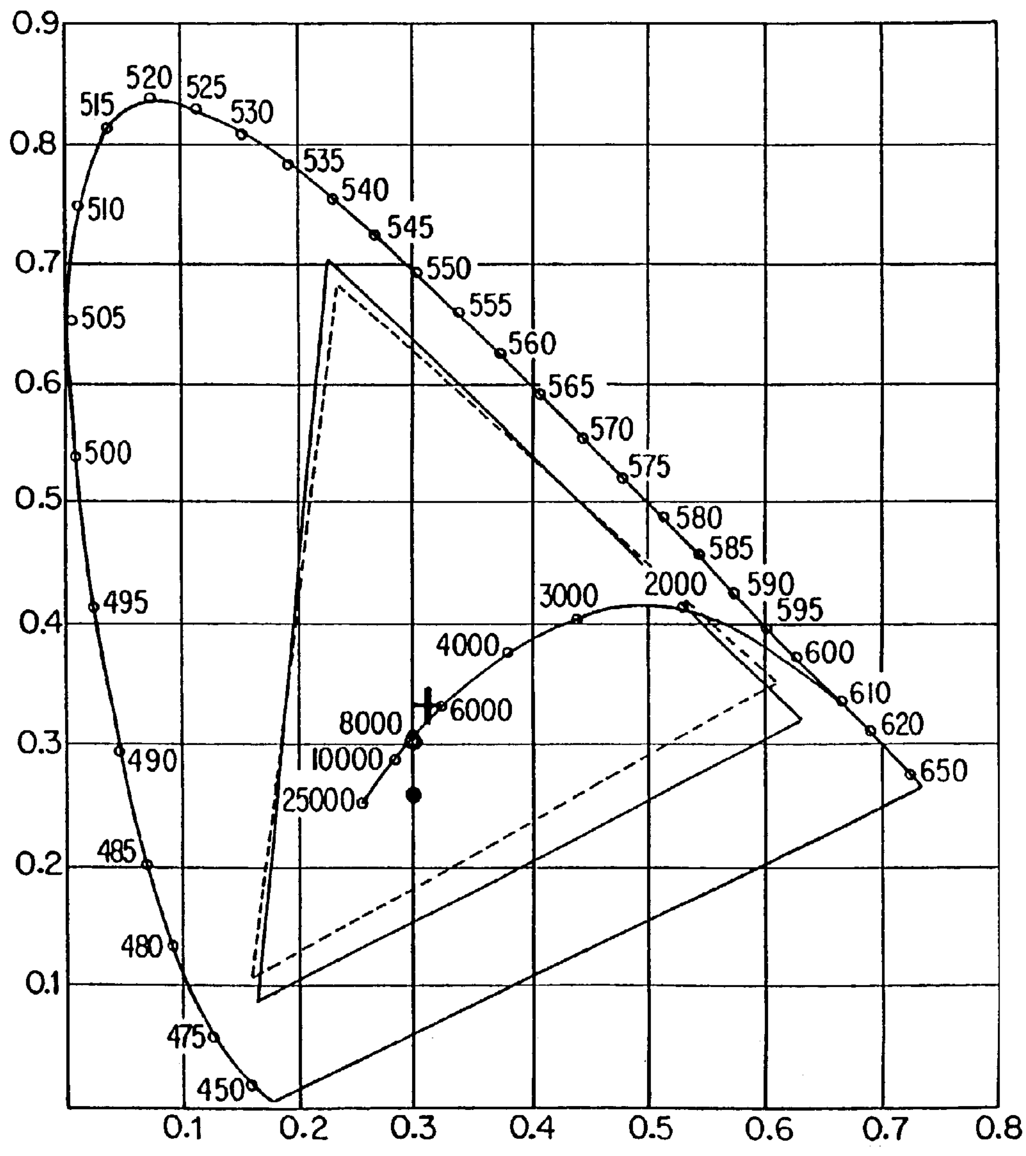
FIG. 8 is the chromaticity diagram of the dye set containing 0.40% ABS 574 and 0.80% ABS 594 in combination with 1.0% Astrazon Orange and 1.0% Luxol Fast Blue in a PVA matrix.

FIG. 8 illustrates the CIE standard chromaticity diagram with the improved light transmittance over a plasma display panel without a filter. Also, there was an improved color temperature of about +1,500° K, a relative brightness of about 47.1%, relative contrast of about 1.99% and a figure-of-merit of about 0.9372. The ΔE of red, green, and blue was about 35.8, 27.0, and 19.7, respectively. Thus, an observer can completely distinguish the red, green and blue of the plasma display panel with the filter over the red, green and blue of the plasma display panel without the filter. Table 2 again sets forth the color coordinates of the PDP with and without the filter as well as other optical properties.

FIG. 19 illustrates the intensity of the blue, green and red primary colors of the phosphor of the plasma display panel. The graph with the dotted graph shows the intensity of the phosphor without the present filter. The blue phosphor emission spectrum is at about 450 nm, the green phosphor is at about 515 nm, and the red phosphor emission is at about 610 nm and about 625 nm with an orange emission at about 590 nm. The red phosphor emission spectrum has a low red color purity because of the intense orange peak around 590 nm.

The addition of the present filter to the plasma display panel significantly reduces the intensity of the unwanted orange peak at about 590 nm as shown by the solid graph in FIG. 19. The filter of the present invention reduces the intensity of the orange peak to improve the red color purity of the red phosphor emission spectrum. Thus, as shown by the graphs of FIG. 19, the filter of the present invention improves the color contrast and enhancement of a plasma display panel.

EXAMPLE 4

The dye set of the present example was made in an attempt to produce a true gray rest color. The present dye set offers a neutral appearance under ambient light but with the trade-off of the ability to improve the color temperature of the plasma display panel. The filter was a two-layer filter as prepared in Example 3 except that the first layer contained ABS 574 at a weight of about 0.25% and ABS 594 at a weight of about 0.50% of the polymethyl methacrylate matrix. The components of the second layer were identical as in Example 4 except the second layer was 12 microns thick.

Figure 9:
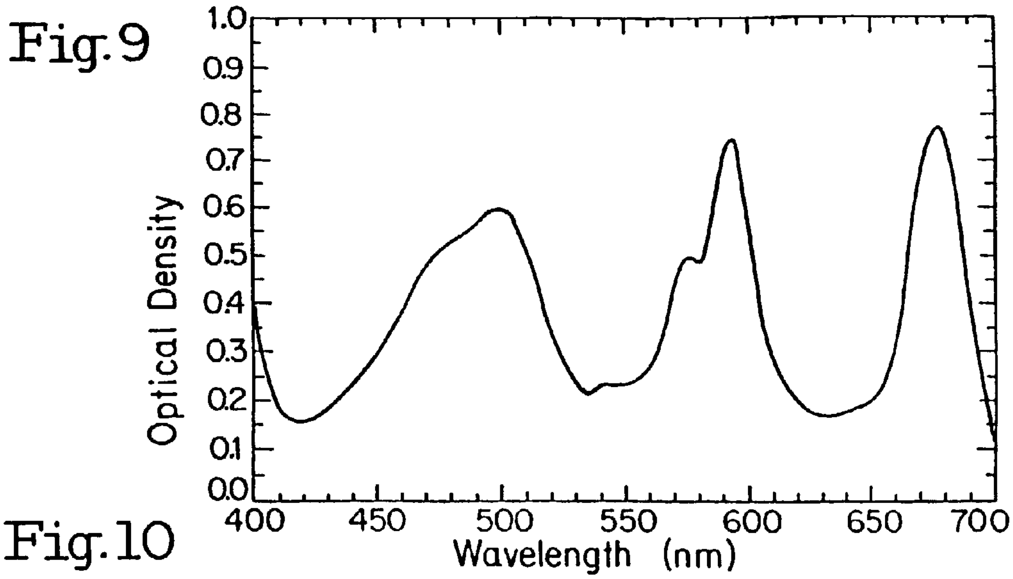
FIG. 9 discloses the absorbance spectrum of dye set containing 0.25% ABS 574 and 0.50% ABS 594 in a PMMA matrix in combination with Astrazon Orange 1.0% and Luxol Fast Blue 1.0% in a PVA matrix.
Figure 10:
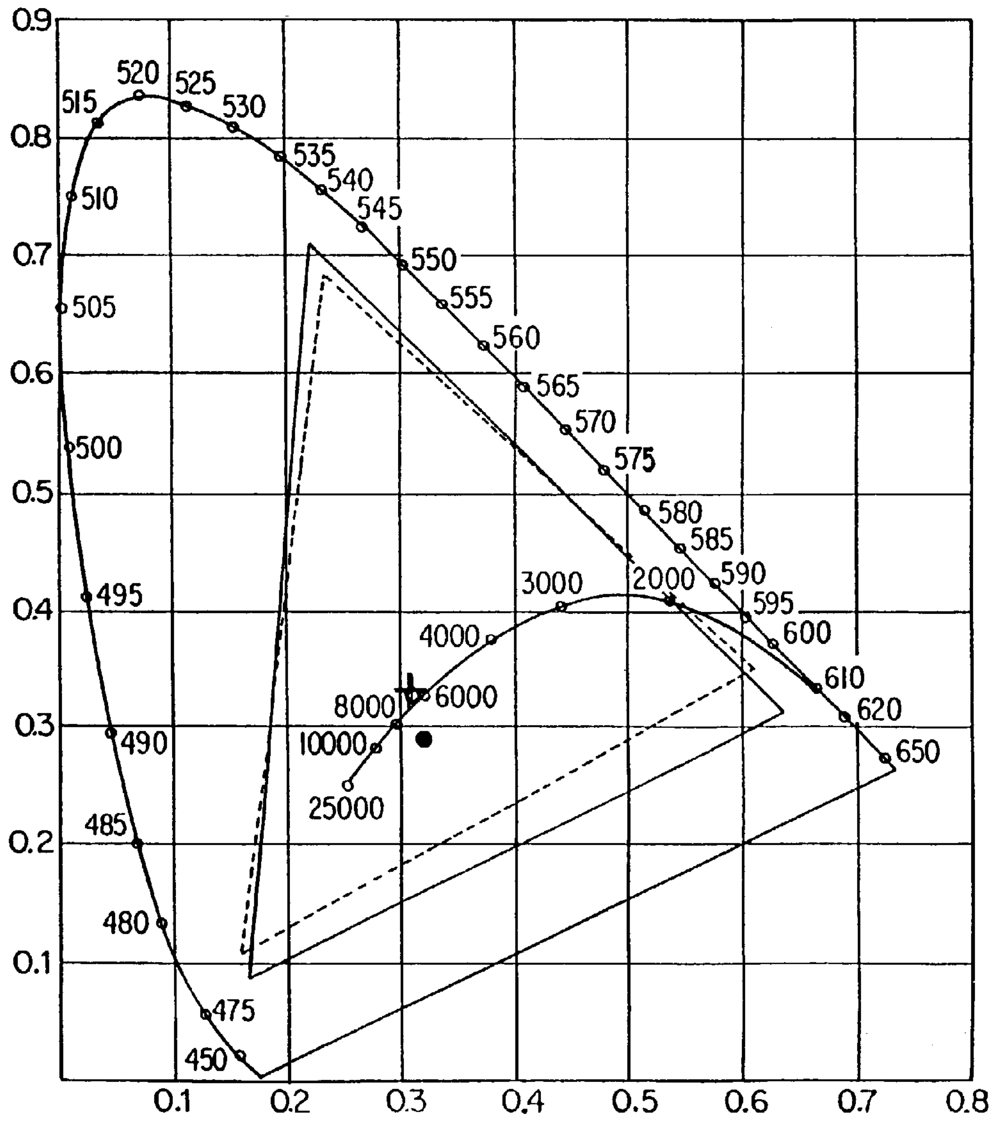
FIG. 10 is the chromaticity diagram of the dye set containing 0.25% ABS 574 and 0.50% ABS 594 in combination with Astrazon Orange 1.0% and Luxol Fast Blue 1.0% in a PVA matrix.

FIG. 9 illustrates the absorbance spectrum of the dye set as modified from the dye set of Example 3. The chromaticity diagram of FIG. 10 illustrates the improved transmittance of the dye set in contrast to a plasma display panel without the present filter.

The present dye set had a improved color temperature of only about 400° K in contrast to the improved color temperatures of the other dye sets. The relative brightness was about 36.7, the relative contrast was about 2.42, and the figure-of-merit was about 0.89. Thus, to improve the relative contrast, the dye set sacrificed color temperature, relative brightness, and figure-of-merit, see Table 2.

The ΔE of the red, green, and blue transmissions were about 42.5, 36.3, and 28.7, respectively. Thus, an observer can completely distinguish the red, green, and blue of the plasma display panel with the filter over the red, green, and blue of the plasma display panel without the filter.

EXAMPLE 5

The present dye set also offered a neutral appearance under ambient light with the trade-off ability to improve the color temperature of the plasma display panel. The present dye set was prepared as the dye set in Example 4, except that the second layer had a thickness of 12 microns.

Figure 11:
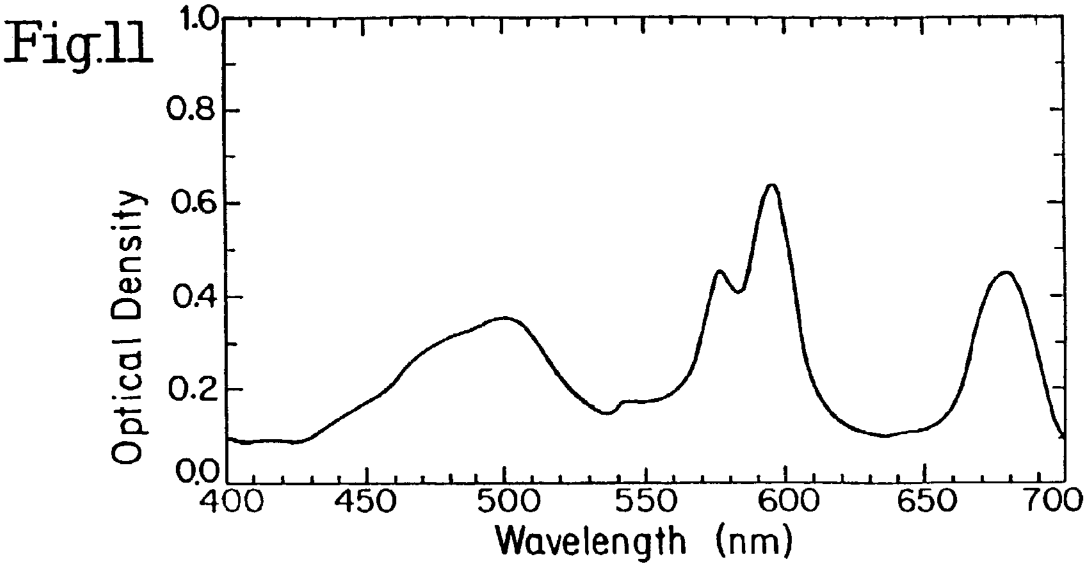
FIG. 11 is the absorbance spectrum of a dye set containing 0.25% ABS 574 and 0.50% ABS 594 in a 6 micrometer PMMA matrix layer in combination with a second 6 micrometer PVA matrix layer containing Astrazon orange 1.0% and Luxol Fast Blue 1.0%.
Figure 12:
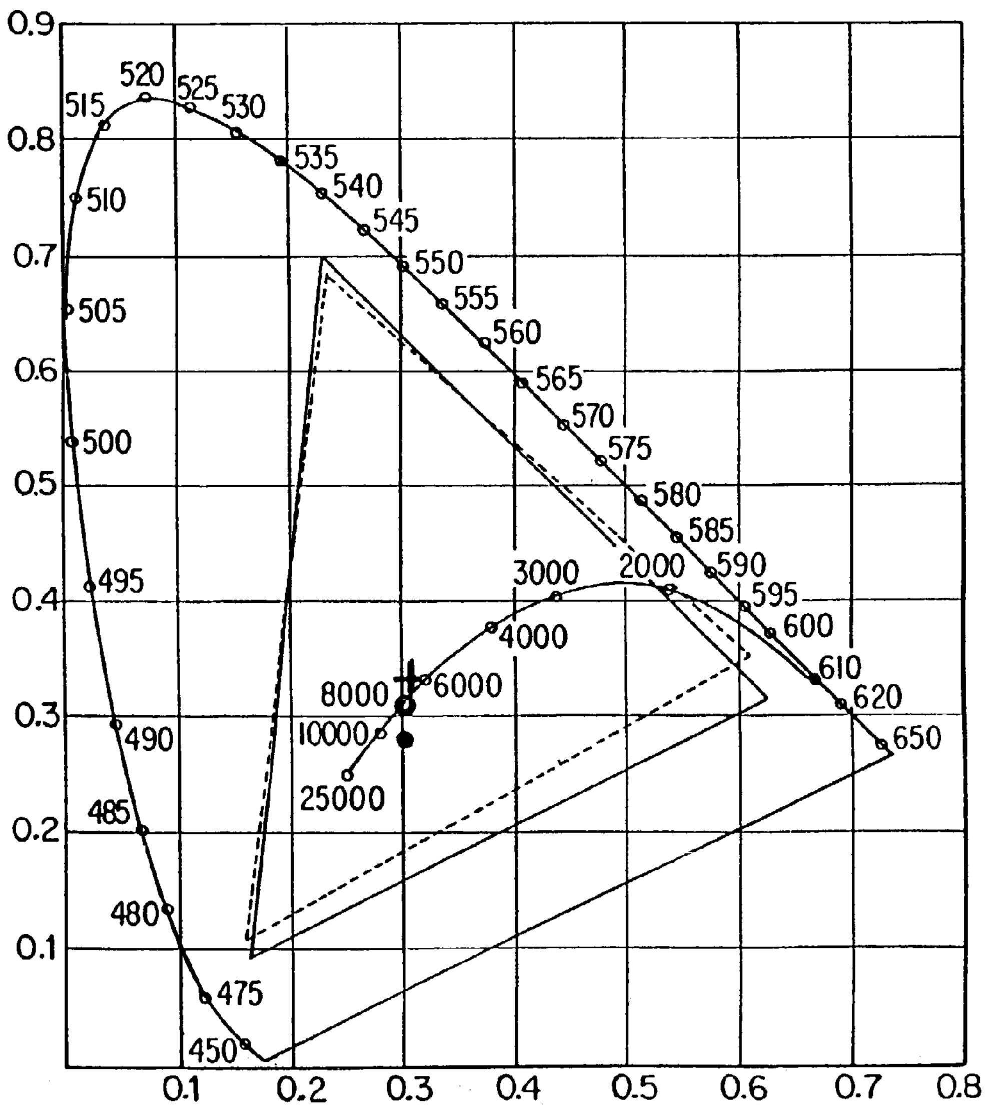
FIG. 12 is a chromaticity diagram of the dye set containing 0.25% ABS 574 and 0.50% ABS 594 in a first 6 micrometer PMMA matrix layer in combination with a second 6 micrometer PVA matrix layer containing 1.0% Astrazon Orange and 1.0% Luxol Fast Blue.

FIG. 11 illustrates the absorbance spectrum of the present dye set and FIG. 12 illustrates a chromaticity diagram of the present dye set showing the transmittance of red, green, and blue light as opposed to a plasma display panel without the filter.

From Table 2 it can be seen that the present dye set increased the brightness from about 37% in Example 4 to about 56.9% and increased transmission in the blue region. Also the figure-of-merit improved significantly from the dye set of Example 4 from about 0.8 to about 0.96, while slightly compromising the improvement of green color purity. Color temperature was improved, about 1,000° K relative to the PDP, without a filter. The relative contrast was about 1.69.

The ΔE of the red, green, and blue color coordinates were about 28.8, 19.2, and 15.2 respectively. Thus, an observer can completely distinguish the red, green, and blue colors of the plasma display panel with the filter over the plasma display panel without the filter.

EXAMPLE 6

The present dye filter was prepared by a casting method as opposed to the coating method of the previous examples. The present filter was cast onto the surface of the plasma display panel. The filter was formed from a cellulose acetate layer about 50 microns in thickness. The dye set consisted of Astrazon Orange, ABS 574, ABS 594, and Luxol Fast Blue. All the dyes were added to a solution of acetone and methanol and mixed with cellulose acetate. A few drops (about 0.01% by weight) of the surfactants Genepole® and Dynol® were added. The film was then cast on the glass surface of the plasma display panel by using a commercial scale casting equipment. The final dry weight of the dyes in relation to the cellulose acetate matrix was about 0.065% of Astrazon Orange, about 0.024% of ABS 574, about 0.048% of ABS 594, and about 0.060% of Luxol Fast Blue.

Figure 13:
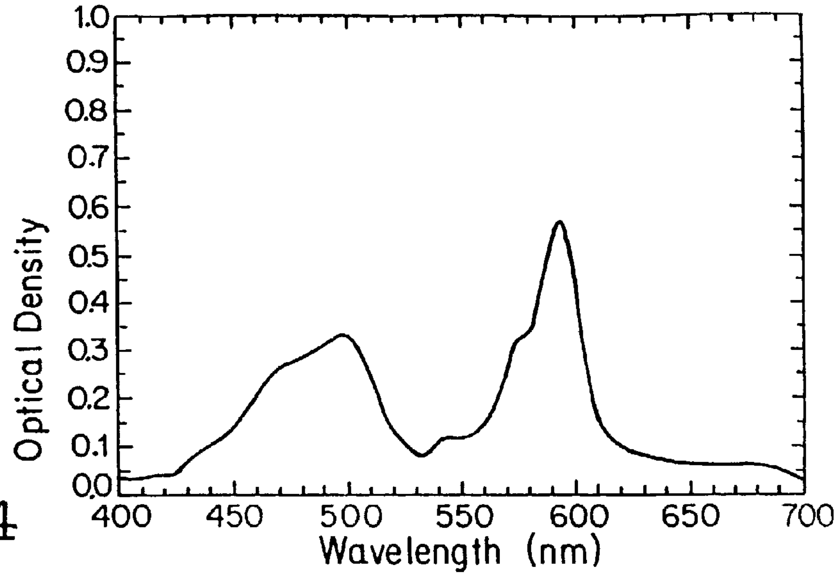
FIG. 13 is the absorbance spectrum of a dye set containing 0.065% Astrazon Orange, 0.024% ABS 574, 0.048% ABS 594, and 0.060% Luxol Fast Blue in a cellulose acetate matrix.
Figure 14:
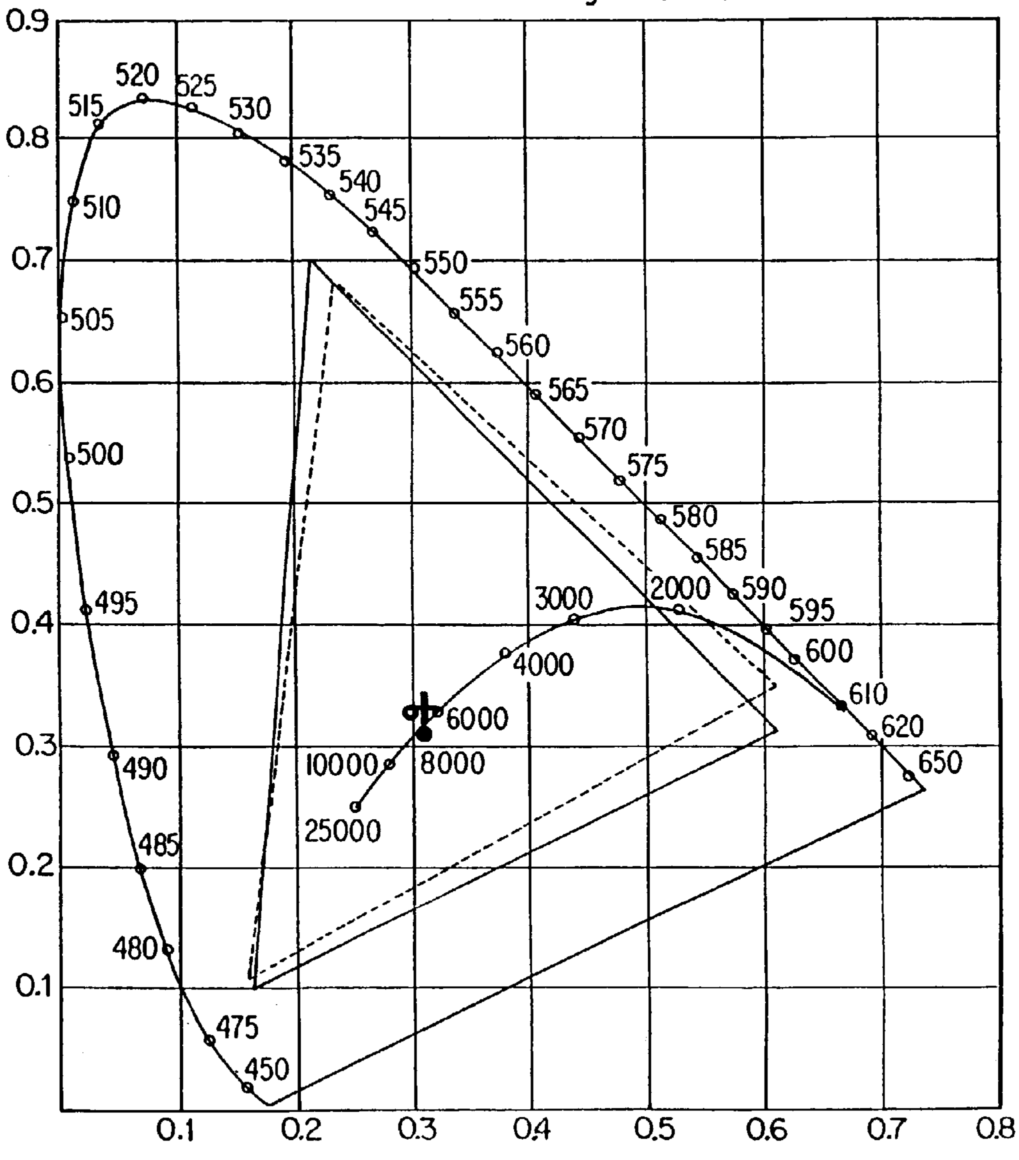
FIG. 14 is a chromaticity diagram of the dye set containing 0.065% Astrazon Orange, 0.024% ABS 574, 0.048% ABS 594, and 0.060% Luxol Fast Blue in a cellulose acetate matrix.

As shown by the data in Table 2 and FIGS. 13 and 14, the performance of the present film was rather impressive. The relative brightness was about 64%, relative contrast about 1.45, and figure-of-merit of about 0.935. The blue transmission was about 68%. Thus, the present dye set showed high brightness, high blue transmission, a significant increase of color gamut, a good figure-of-merit, and an improved color temperature of about +500° K.

The ΔE of the red, green, and blue color coordinates was about 25.7, 12.2, and 13.1, respectively. Thus, an observer can completely distinguish the red color of the plasma display panel with the filter over the plasma display panel without the filter, and at least observe that an obvious difference exists between the green and blue of the plasma display panel with the filter over the panel without the filter.

EXAMPLE 7

The filter of this example was an attempt to reproduce dye set 3 (Example 3) using a single layer coating.

The present dye combination of Disperse Yellow 9, Astrazon Orange, ABS 574, ABS 594, and Luxol Fast Blue was mixed in a solution of 40% methyl ethylketone and 60% methanol. Additionally, polyvinyl butyrate (polymer matrix) was dissolved in water to 20 weight %. The dye composition was then added to the solution of polyvinyl butyrate. The film was spun-coated on a 4 mil (100 microns) thick PET film at about 1,000 rpm for about 30 seconds. The film was then dried in an oven at about 50° C. for about 30 minutes to achieve a total dry film thickness of about 5 microns. The weight of the dyes in the dry polyvinyl butyrate matrix was about 0.45% Astrazon Orange, about 0.25% ABS 574, about 0.50% ABS 594, and about 0.55% Luxol Fast Blue. This was mounted on a plasma display panel (a 5 inch color television monitor).

Figure 15:
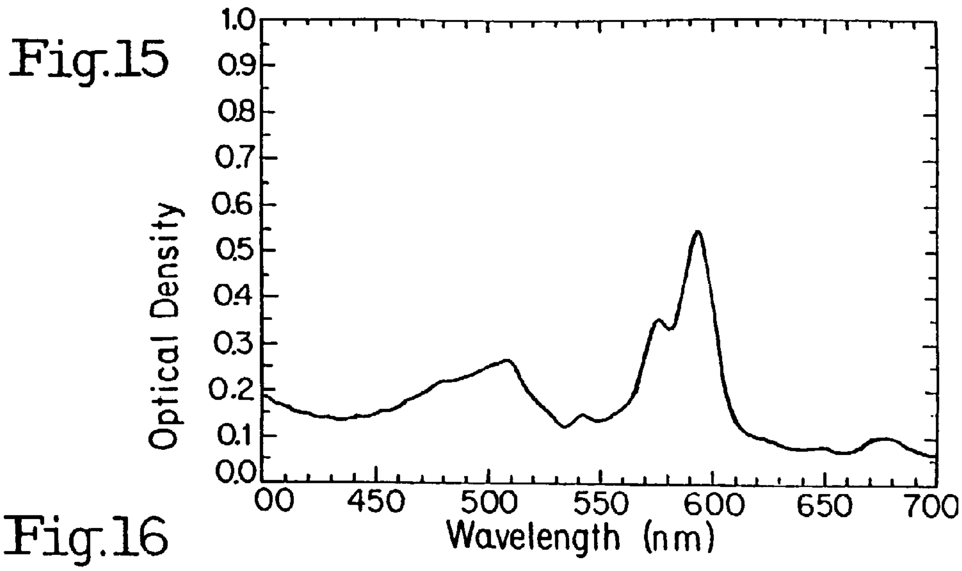
FIG. 15 is the absorbance spectrum of a dye set containing 0.45% Disperse Yellow 9, 0.45% Astrazon Orange, 0.25% ABS 574, 0.50% ABS 594, and 0.55% Luxol Fast Blue in a polyvinyl butyrate matrix.
Figure 16:
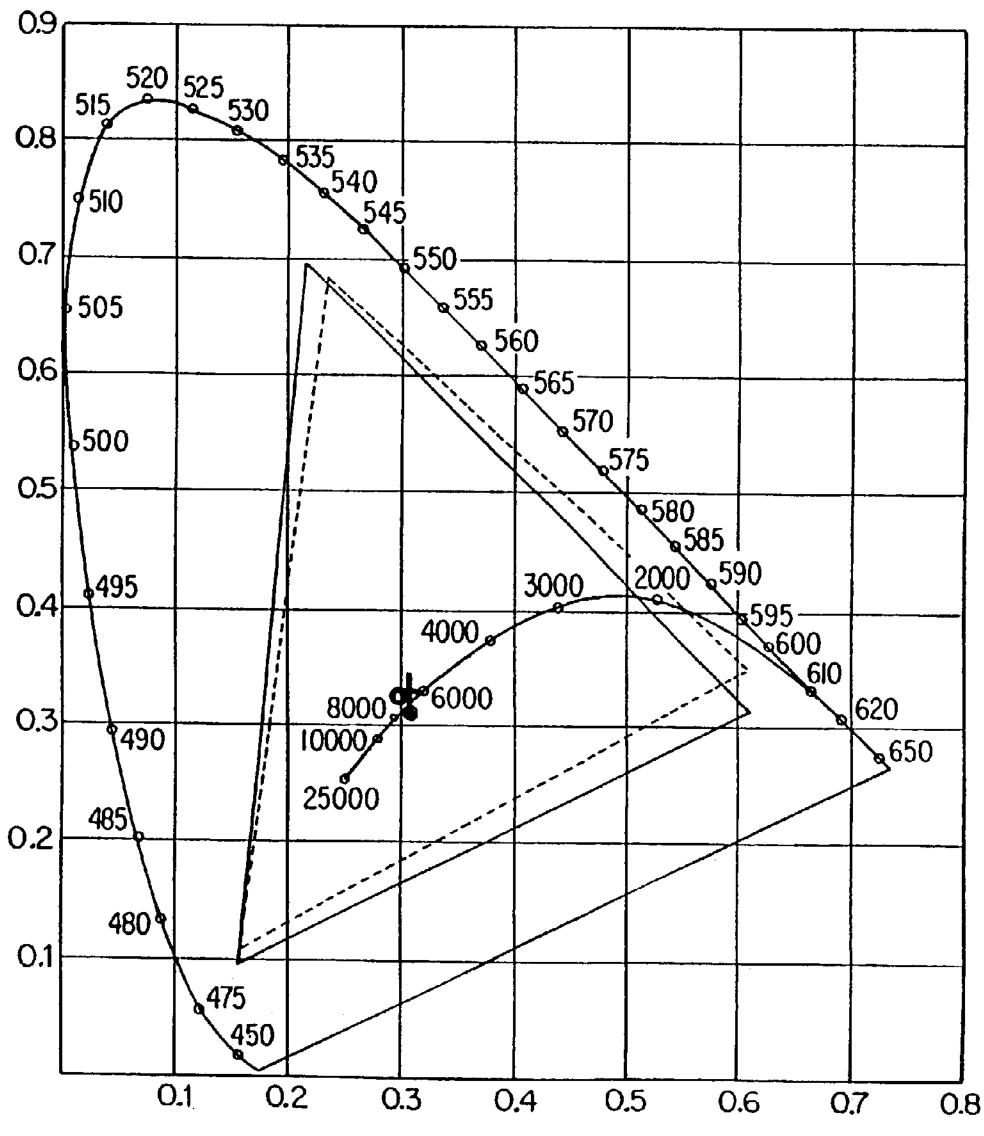
FIG. 16 is a chromaticity diagram of the dye set containing 0.45% Disperse Yellow 9, 0.45% Astrazon Orange, 0.25% ABS 574, 0.50% ABS 594, and 0.55% Luxol Fast Blue in a polyvinyl butyrate matrix.

Again from Table 2, a significant improvement in color temperature was observed, i.e., about 800° K. The relative brightness was about 62% with a high blue transmission of about 69%, yet with an acceptable rest color. The relative contrast was about 1.51 with a good figure-of-merit of about 0.94%. FIG. 15 illustrates the absorbance spectrum of the subject dye set and FIG. 16 shows the improved transmittance of blue, green, and red colors in contrast to a plasma display panel without the present filter.

The ΔE of the red, green, and blue coordinates was about 24.6, 16.8, and 12.0, respectively. Thus, an observer can completely distinguish between the red and green from the plasma display panel with the filter over the plasma display panel without the filter, and may conclude that there is at least an obvious difference between the blue of the panel with the filter over the panel without the filter.

EXAMPLE 8

The dye set was composed of about 0.12% by weight of Astrazon Orange, about 0.18% by weight of ABS 574, about 0.32% by weight of ABS 574, about 0.32% by weight of ABS 594, and about 0.38% by weight of Luxol Fast Blue in a polymethyl methacrylate polymer matrix. The solvent employed was a mixture of 80% methyl ethylketone and 20% dimethylfuran. The dye set was spun-coated into a 7 micron film on PET.

It was learned that IR radiation from the plasma emitted by PDP interferes with the operation of remote control units, requiring IR shielding in filters. Accordingly, this dye set was designed to meet this requirement by adding about 7% by weight IRA 850 to the polymer/dye solution.

The present dye set offered a neutral appearance under ambient light but with the ability of blocking off near infrared radiation emitted by the plasma without any compromise in the image enhancement performance. Also, polymethyl methacrylate resin was again employed in preparing the filter. Polymethyl methacrylate is an optically better performer than polyvinyl butyrate. Additionally, an unexpected improvement in stability was also observed. While not holding to any particularly theory, the lower moisture absorption from polymethyl methacrylate as opposed to polyvinyl butyrate may explain the improvement in stability.

Figure 17:
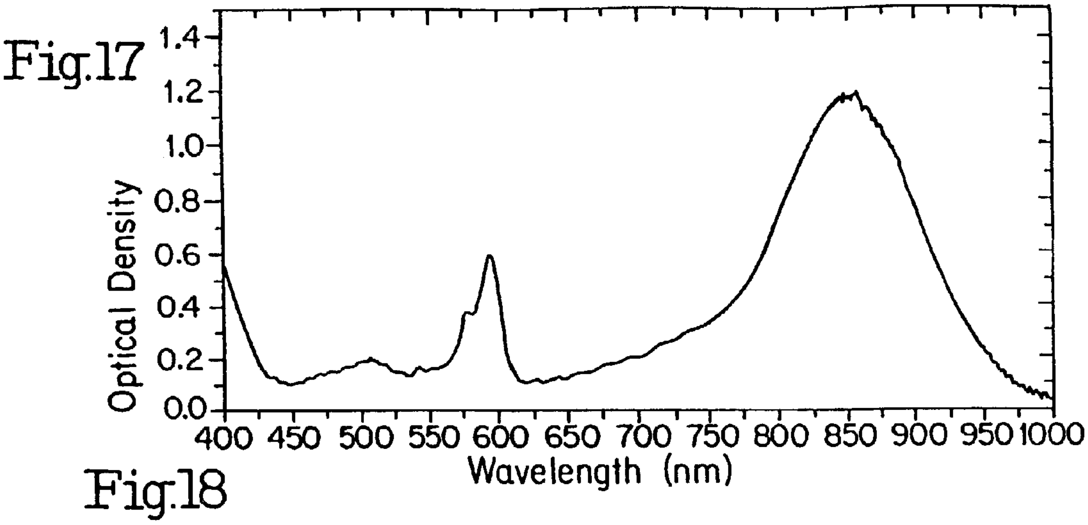
FIG. 17 is the absorbance spectrum of a dye set containing 0.12% Astrazon Orange, 0.18% ABS 574, 0.32% ABS 594, and 0.38% Luxol Fast Blue, with an IR radiation shielding component in a PMMA matrix.
Figure 18:
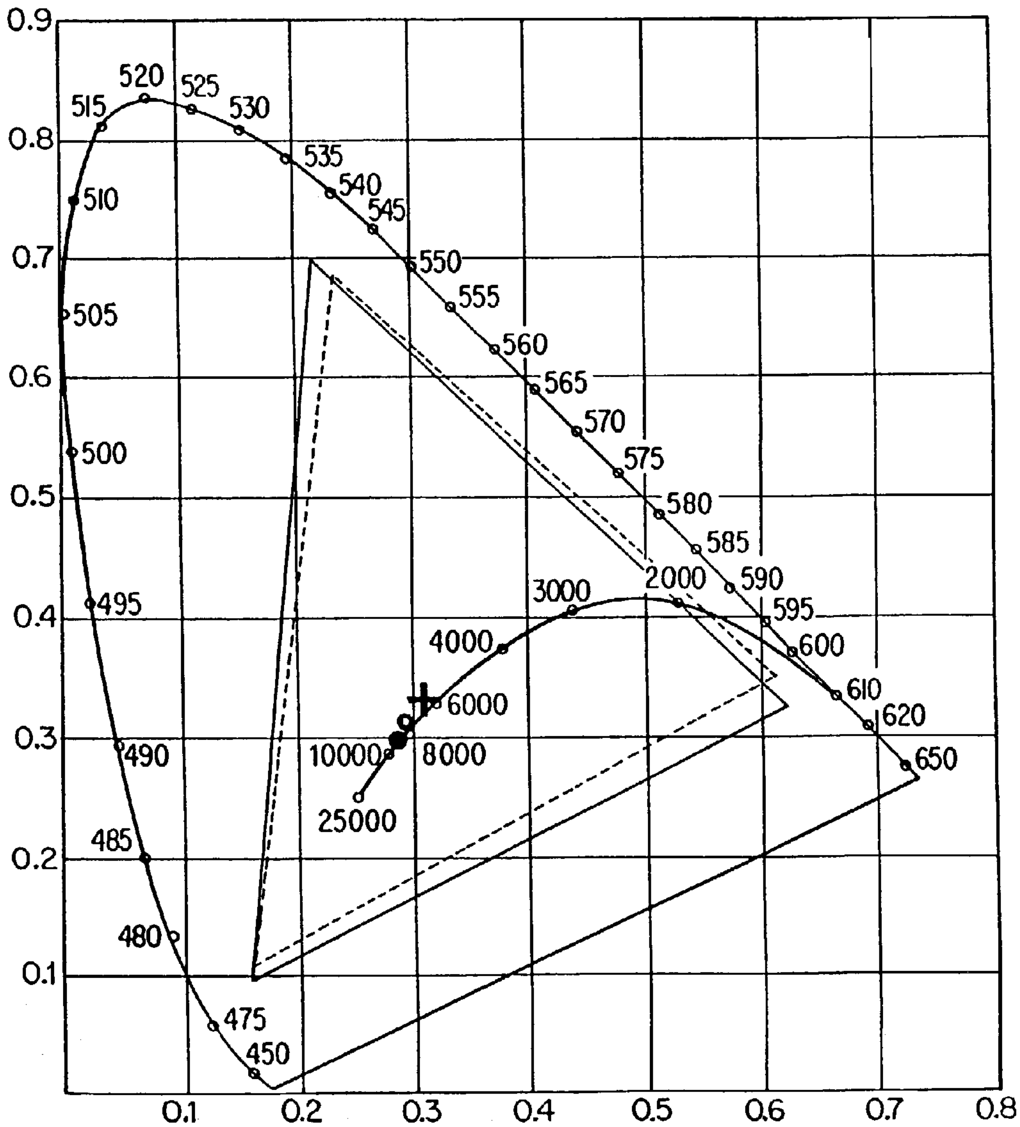
FIG. 18 is a chromaticity diagram of the dye set containing 0.12% Astrazon Orange, 0.18% ABS 574, 0.32% ABS 594, and 0.38% Luxol Fast Blue, with an IR radiation shielding component in a PMMA matrix.

FIG. 17 illustrates the absorbance spectrum of the present dye set. FIG. 18 illustrates the chromaticity diagram showing improved color contrast in the red, green, and blue wavelengths over a plasma display panel without the filter. Also, the present dye set showed an improved color temperature of about +15,000° K, an improved relative brightness of about 62.2% with a relative contrast of about 1.523, a good figure-of-merit of about 0.95, see Table 2, and also an improved blue transmission of about 73%.

The ΔE of the red, green, and blue coordinates was about 28.8, 16.0, and 9.6, respectively. Thus, an observer can completely distinguish the red and green colors of the plasma display with the filter over the plasma display panel without the filter, and can at least conclude that there is an obvious difference between the blue of the plasma display panel with the filter over the panel with the filter.

and one or more of the outer surfaces of the glass have metal electrodes, and wherein the filter is on the face of the outer glass surface.

8. The plasma display device of claim 7, wherein the inert gas mixture comprises one or more of helium, neon, argon or xenon.

9. The plasma display device of claim 7, wherein the inert gas mixture comprises neon.

10. The plasma display device of claim 1, wherein the bandwidth of the absorption is within the range 30 to 33 nm.

TABLE 2

Polymeric Image Enhancement Film Comparison of Performance of Dye Sets on PDP

| | Red | Green | Blue | White | Ambient | Color Temp ° K. | Brightness | Contrast | Figure of Merit |
|---|---|---|---|---|---|---|---|---|---|
| No filter | 0.607, 0.353 | 0.236, 0.684 | 0.157, 0.107 | 0.311, 0.334 | 0.310, 0.317 | 6500 | 1 | 1 | 1 |
| Example 1 | 0.622, 0.310 | 0.194, 0.697 | 0.149, 0.089 | 0.263, 0.276 | 0.246, 0.206 | 20000 | 0.582 | 1.57 | 0.9137 |
| Example 2 | 0.621, 0.314 | 0.200, 0.698 | 0.149, 0.093 | 0.266, 0.289 | 0.250, 0.227 | 14000 | 0.636 | 1.47 | 0.9349 |
| Example 3 | 0.627, 0.321 | 0.227, 0.700 | 0.159, 0.087 | 0.295, 0.308 | 0.295, 0.257 | 8000 | 0.471 | 1.99 | 0.9372 |
| Example 4 | 0.633, 0.322 | 0.235, 0.705 | 0.165, 0.089 | 0.310, 0.330 | 0.318, 0.295 | 6900 | 0.367 | 2.42 | 0.8881 |
| Example 5 | 0.623, 0.329 | 0.228, 0.699 | 0.159, 0.094 | 0.298, 0.321 | 0.297, 0.281 | 7500 | 0.569 | 1.69 | 0.9616 |
| Example 6 | 0.622, 0.330 | 0.227, 0.702 | 0.160, 0.097 | 0.296, 0.330 | 0.304, 0.315 | 7000 | 0.640 | 1.45 | 0.9350 |
| Example 7 | 0.622, 0.331 | 0.230, 0.695 | 0.157, 0.099 | 0.298, 0.323 | 0.308, 0.311 | 7300 | 0.620 | 1.51 | 0.9400 |
| Example 8 | 0.619, 0.329 | 0.222, 0.696 | 0.154, 0.098 | 0.286, 0.316 | 0.283, 0.299 | 8000 | 0.622 | 1.52 | 0.9500 |

What is claimed is:

1. A plasma display device comprising a spectrally tuned filter, said filter having at least one absorption (λ1) of an electromagnetic spectrum emitted or reflected from the device, said absorption (λ1) falling in the following region (A):

$$550\ \text{nm} < \lambda 1 < 610\ \text{nm} \quad \text{(A)},$$

wherein the bandwidth of the absorption (λ1) is within the range 30 to 35 nm, and the maximum optical density of the filter is from 0.55 to 0.80 in the region (A) and the minimum optical density of the filter is from 0.12 to 0.23 in the region (A).

2. The plasma display device of claim 1, wherein the filter absorbs at least 50% of the electromagnetic spectrum at the absorption (λ1) and the maximum optical density is no greater than 0.80.

3. The plasma display device of claim 1, wherein the filter is adhered to the plasma display device.

4. The plasma display device of claim 1, wherein the filter is coated onto a transparent substrate selected from the group consisting of glass and polymeric materials.

5. The plasma display device of claim 1, wherein the filter comprises a polymethyl methacrylate polymer matrix.

6. The plasma display device of claim 1, wherein the filter comprises one or more dyes dispersed in a polymer matrix comprising at least one selected from the group consisting of a polyvinyl alcohol, a polyvinyl acetate, a vinyl polymer, a polyacrylate, a polyolefin, a polymethyl methacrylate, a polystyrene, a cycloolefin polymer, a polycarbonate, a polyurethane, a polyamide, a polyester, a polyether, a polyketone, a polyesteramide, and a polyvinyl butyrate.

7. The plasma display device of claim 1, comprising a sandwich of glass sealed at the edges with a low temperature frit enclosing an inert gas mixture, wherein one of the inner glass surfaces has parallel lines of transparent conductors

11. The plasma display device of claim 1, wherein the maximum optical density of the filter is from 0.75 to 0.65.

12. The plasma display device of claim 1, wherein the minimum optical density of the filter is from 0.18 to 0.14.

13. A method for enhancing the contrast of a plasma display device, said method comprising, placing a spectrally tuned filter in the form of a free standing filter in front of the plasma display device, wherein said filter has at least one absorption (λ1) of an electromagnetic spectrum emitted or reflected from the device, wherein the absorption (λ1) falls in the following region (A):

$$550\ \text{nm} < \lambda 1 < 610\ \text{nm} \quad \text{(A)},$$

wherein the bandwidth of the absorption is within the range 30 to 35 nm, and the maximum optical density of the filter is from 0.55 to 0.80 in the region (A) and the minimum optical density of the filter is from 0.12 to 0.23 in the region (A).

14. The method of claim 13, wherein the filter absorbs at least 50% of the electromagnetic spectrum at the absorption (λ1) and the maximum optical density is no greater than 0.80.

15. The method of claim 13, wherein the filter comprises a transparent substrate selected from the group consisting of glass and polymeric materials.

16. The method of claim 13, wherein the filter comprises a polymethyl methacrylate polymer matrix.

17. The method of claim 13, wherein the maximum optical density of the filter is from 0.75 to 0.65.

18. The method of claim 13, wherein the minimum optical density of the filter is from 0.18 to 0.14.

19. The method of claim 13, wherein the bandwidth of the absorption (λ1) is within the range 30 to 33 nm.

20. A free standing filter having at least one absorption (λ1) of an electromagnetic spectrum, falling in the following region (A):

$$550\ \text{nm} < \lambda 1 < 610\ \text{nm} \quad \text{(A)},$$

wherein the bandwidth of the absorption (λ1) is within the range 30 to 35 nm, and the maximum optical density of the filter is from 0.55 to 0.80 in the region (A) and the minimum optical density of the filter is from 0.12 to 0.23 in the region (A).

21. The filter of claim 20, wherein the filter absorbs at least 50% of the electromagnetic spectrum at the absorption (λ1) and the maximum optical density is no greater than 0.80.

22. The filter of claim 20, wherein the filter comprises a transparent substrate selected from the group consisting of glass and polymeric materials.

23. The filter of claim 20, comprising a polymethyl methacrylate polymer matrix.

24. The filter of claim 20, wherein the filter comprises one or more dyes dispersed in a polymer matrix material comprising at least one selected from the group consisting of a polyvinyl alcohol, a polyvinyl acetate, a vinyl polymer, a polyacrylate, a polyolefin, a polymethyl methacrylate, a polystyrene, a cycloolefin polymer, a polycarbonate, a polyurethane, a polyamide, a polyester, a polyether, a polyketone, a polyesteramide, and a polyvinyl butyrate.

25. The filter of claim 24, wherein the polymer matrix further comprises one or more surfactants.

26. The filter of claim 20, wherein the bandwidth of the absorption (λ1) is within the range 30 to 33 nm.

27. The filter of claim 20, wherein the maximum optical density of the filter is from 0.75 to 0.65.

28. The filter of claim 20, wherein the minimum optical density is from 0.18 to 0.14.

* * * * *